United States Patent [19]
Baker

[11] Patent Number: 5,550,455
[45] Date of Patent: Aug. 27, 1996

[54] STANDBY GENERATOR PULSE EXCITATION SYSTEM AND ELECTRIC POWER GENERATING SYSTEM FOR USE THEREIN

[75] Inventor: Roy S. Baker, Rockford, Ill.

[73] Assignee: Sundstrand Corporation, Rockford, Ill.

[21] Appl. No.: 329,745

[22] Filed: Oct. 26, 1994

[51] Int. Cl.⁶ .................................................... H02P 9/00
[52] U.S. Cl. .................................. 322/23; 322/8; 307/57
[58] Field of Search ................................... 322/23, 59, 89, 322/99, 100

[56] References Cited

U.S. PATENT DOCUMENTS

| | | | |
|---|---|---|---|
| 4,308,465 | 12/1981 | Lafuze | 307/87 |
| 4,379,990 | 4/1983 | Sievers et al. | 322/99 |
| 4,446,417 | 5/1984 | Fox et al. | 322/25 |
| 4,604,565 | 8/1986 | Yokota et al. | 320/15 |
| 4,613,808 | 9/1986 | Edwards | 322/99 |
| 4,623,833 | 11/1986 | Edwards | 322/28 |
| 4,741,023 | 4/1988 | Lawson | 379/106 |
| 4,967,096 | 10/1990 | Diemer et al. | 307/19 |
| 4,999,564 | 3/1991 | D'Antonio et al. | 322/99 |

Primary Examiner—Thomas M. Dougherty
Assistant Examiner—Nicholas Ponomarenko
Attorney, Agent, or Firm—Jeffery J. Makeever

[57] ABSTRACT

A back-up electric power generating system comprises a first variable speed synchronous generator drivably coupled to a first prime mover, a second variable speed synchronous generator drivably coupled to a second prime mover, a converter having a first and a second input coupled to the first and second generators respectively, and an output, and a logic circuit in controlling communication with the converter for designating one of the first or second generators as a primary power source and one as a standby power source, exclusively. The system further comprises a primary voltage regulator selectably coupled to the primary power source generating a controlled current signal to maintain its output voltage at a given level, and a pulse exciter selectably coupled to the standby power source for verifying the operational readiness of the standby power source. This pulse exciter generates a current pulse signal to the exciter field of said standby power source and monitors the output voltage generated thereby. The converter produces a constant frequency voltage output. The method of verifying the operational readiness of a generator drivably coupled to a prime mover, the generator having an exciter field, a rotor, and a poly-phase wound stator forming an output, comprises the steps of a) providing a current pulse to the exciter field, b) monitoring the generator output, and c) indicating the operational status as ready upon detecting a voltage pulse on the generator output in response to the current pulse, or as not ready upon detecting the lack of a voltage pulse on the generator output in response to the current pulse.

13 Claims, 3 Drawing Sheets

STANDBY GENERATOR PULSE EXCITATION SYSTEM AND ELECTRIC POWER GENERATING SYSTEM FOR USE THEREIN

FIELD OF THE INVENTION

The instant invention relates generally to a back-up variable speed constant frequency (VSCF) electric power generation system, and more particularly to a pulse excitation system for a standby generator providing assurance of standby generator availability without a separate voltage regulator.

BACKGROUND ART

The airline industry continues to undergo an evolution leading to longer range, lower cost, greater capacity aircraft as the demand for air travel continues to rise. With the evolution of higher efficiency, higher thrust engines, it is possible for the aircraft manufacturers to produce twin engine planes with ranges and payloads far exceeding expectations. As the range of these new advanced aircraft increases opening up routes never before available, the greater the likelihood that the aircraft will be a long way from a suitable airport in case of emergency. To minimize the risk to these aircraft and their passengers and cargo, the Federal Aviation Administration (FAA) and other world regulatory authorities have imposed strict safety requirements for the certification and operation of twin engine planes.

In the United States of America, the FAA has imposed a stringent set of requirements which must be met before certification of a twin engine aircraft is granted for extended twin engine operation (ETOPS). These increased requirements affect nearly every system on the aircraft and are designed to ensure that the plane can continue to fly safely to a suitable airport in case of an emergency, such as the loss of one of the two engines. One of the systems affected by these increased ETOPS requirements is the electric power generating system (EPGS).

A typical EPGS has one generator mounted on each main engine to produce the required electric power for the aircraft. The electrical output from each of these generators, assuming more than one engine, is coupled through a plurality of relays or contactors to the various loads and systems which require electric power. Some of the larger electric power generating systems operate in parallel to allow the total system load to be shared equally by all of the generators, and to allow greater fault clearing capability. Other systems operate to maintain complete isolation between the generators to ensure that no single fault can cause the loss of all electric power. Regardless of its normal operating mode, parallel or isolated, all systems are required by the FAA to achieve or maintain at least two channel electrical isolation during certain flight phases, such as landing for example. With a two engine aircraft, the available sources of primary electric power only number two to start with, and the loss of an engine will not allow two isolated channels. In order to be certified to the higher ETOPS requirements, a third source of electric power capable of operating with either engine inoperative was needed.

The solution to this problem, as illustrated in FIG. 1, was to include a small variable speed back-up generator 100, 102 on each engine in addition to the main integrated drive generators (IDGs) 104, 106 manufactured by the assignee of the instant invention. The output from each of these generators is coupled to a single back-up converter 108 which is available to supply certain loads during required periods of operation. Since the converter only requires power to be supplied from one of the two back-up generators (the primary generator), the other back-up generator (the standby generator) could be left de-energized to conserve power. However, since the operation of this standby generator must be verifiable and verified prior to and during each flight, a separate voltage regulator is required for this standby generator. This second voltage regulator is required to maintain output voltage regulation at a level below that of the primary generator to ensure that only the primary generator supplies the system loads. This requirement of a second voltage regulator increases the weight, cost, and complexity, and decreases the reliability of the system.

The instant invention is directed at overcoming this problem by providing a system to verify the operational readiness of the standby generator prior to and during flight to ensure maximum system safety while reducing system weight, cost, and complexity, and increasing system reliability.

SUMMARY OF THE INVENTION

It is the principle objective of the instant invention to provide a new and improved back-up electric power generating system. More specifically, it is the principle objective of the instant invention to provide a verifiable third source of electric power for a two engine aircraft and a method of verification of the operational readiness of that third source which will allow extended twin engine operation certification.

In a preferred embodiment of the instant invention a back-up electric power generating system comprises a first variable speed synchronous generator drivably coupled to a first prime mover, the first generator having an exciter field, a rotor, and a poly-phase wound stator forming a first output, the first generator producing a voltage signal on its output in response to a current signal applied to its exciter field. The system further comprises a second variable speed synchronous generator drivably coupled to a second prime mover, the second generator also having an exciter field, a rotor, and a poly-phase wound stator forming a second output, and producing a voltage signal on its output in response to a current signal applied to its exciter field. The system also comprises a converter having a first and a second input coupled to the first and second generators respectively, and an output. A logic circuit in controlling communication with this converter designates one of the first or second generators as a primary power source and the other as a standby power source. This embodiment includes a circuit selectably coupled to the exciter field of the primary power source, i.e. to the exciter field of the generator which has been designated as the primary power source, and in controlled communication with the logic circuit for regulating the output voltage of the primary power source. This regulating circuit, or voltage regulator, generates a controlled current signal to maintain the output voltage at a given level. Additionally, this preferred embodiment comprises a circuit selectably coupled to the exciter field of the standby power source, i.e. to the exciter field of the generator which has been designated as the standby power source, and in controlled communication with the logic circuit for verifying the operational readiness of the standby power source. The verifying circuit, or pulse exciter, generates a current pulse signal to the exciter field of the standby power source and monitors the output voltage generated thereby. The converter produces a constant frequency voltage on its output in response to the voltage signal from the primary power source.

In an alternate embodiment of the instant invention, a method of verifying the operational readiness of a generator drivably coupled to a prime mover, the generator having an exciter field, a rotor, and a poly-phase wound stator forming an output, comprises the steps of a) providing a current pulse to the exciter field of the generator, b) monitoring the generator output, and c) indicating the operational status as "ready" upon detecting a voltage pulse on the generator output in response to the current pulse, or as "not ready" upon detecting the lack of a voltage pulse on the generator output in response to the current pulse. These steps may be repeated at regular intervals to continually verify the operational status of the generator. Additionally, the magnitude of the current pulse may be regulated to limit the voltage pulse on the generator output to a percentage of the generator's per unit voltage output.

In a further alternate embodiment of the instant invention, a method of providing a verifiable third source of electric power on a two engine aircraft, the third source having a first variable speed generator drivably coupled to a first prime mover, the first generator having an exciter field, a rotor, and a poly-phase wound stator forming a first output, a second variable speed synchronous generator drivably coupled to a second prime mover, the second generator having an exciter field, a rotor, and a poly-phase wound stator forming a second output, and a converter having a first and a second input coupled to the first and the second generators respectively, and an output, comprises the steps of a) designating one of the first or the second generators as a primary power source and the other as a standby power source, b) generating a controlled current signal to the exciter field of the generator designated as the primary power source to maintain its output voltage at a given level, c) generating a current pulse signal to the exciter field of the generator designated as the standby power source, c) monitoring the output of the standby power source, d) indicating the operational status of the standby power source as "ready" upon detecting a voltage pulse on the output of the standby power source in response to the current pulse, or as "not ready" upon detecting the lack of a voltage pulse on the output of the standby power source in response to the current pulse, and e) converting the output voltage of the primary power source into a constant frequency voltage.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

DETAILED OF THE PREFERRED EMBODIMENTS

Figure 2:
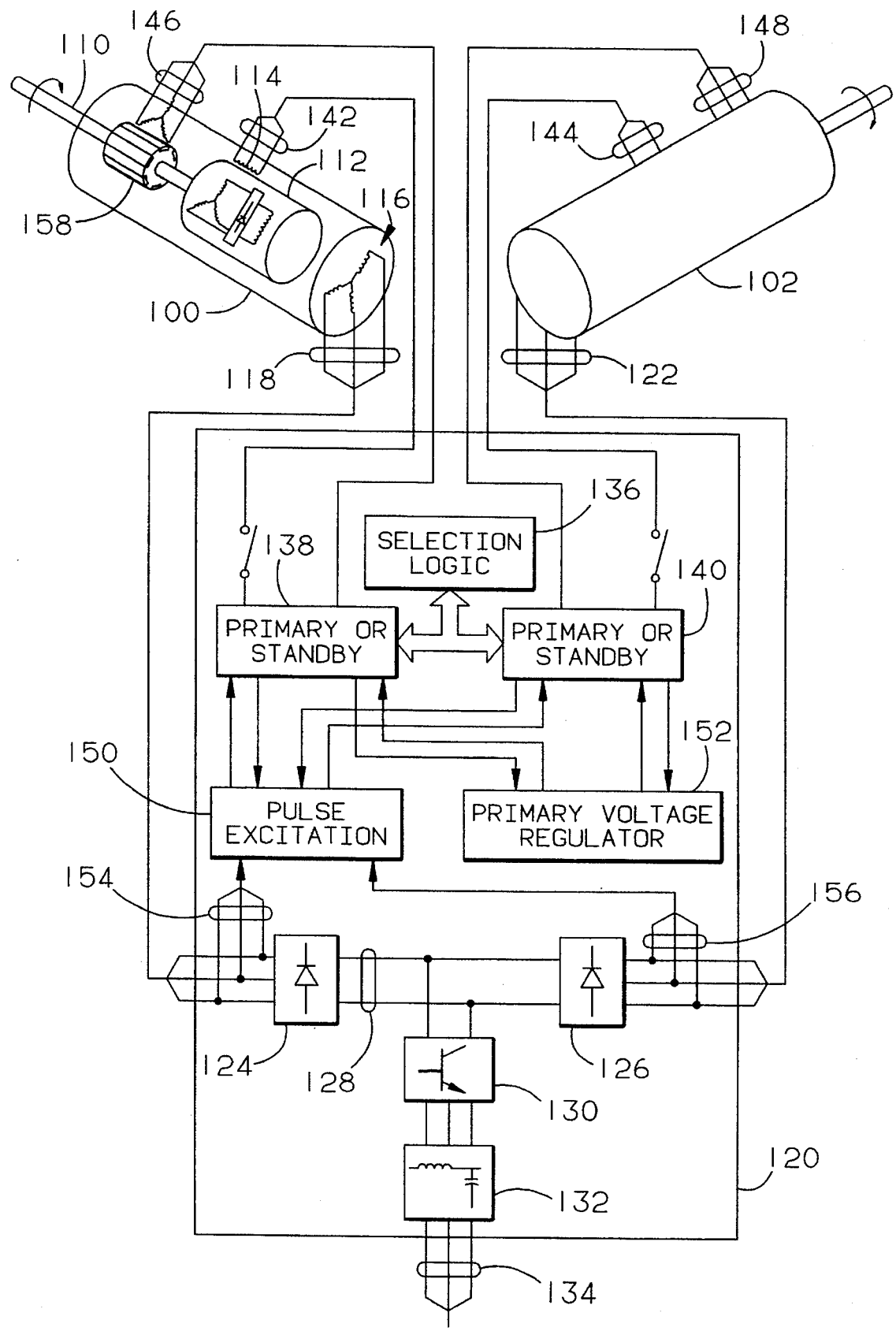
FIG. 2 is a single line block diagram illustrating the back-up EPGS of the instant invention.

As illustrated in FIG. 2, a preferred embodiment of the instant invention comprises a first variable speed synchronous generator 100 drivably coupled by shaft 110 to a first prime mover, such as an aircraft engine (not shown). The generator 100 comprises a rotor 112 which is driven by shaft 110 and excited by an exciter field 114 to produce the main generator excitation to produce a poly-phase AC output on the poly-phase wound stator 116. Preferably, the generator 100 also comprises a permanent magnet generator 158 (PMG) drivably coupled by the shaft 110. The poly-phase output of the generator 100, illustrated as three phases although the number may vary, is coupled by generator feeders 118 to a first input to converter 120. The second input to converter 120 is coupled by a second set of generator feeders 122 to a second variable speed synchronous generator 102. This generator 102 is identical in construction as the first generator 100, and therefore it will not be described in detail herein. Each of these two inputs is coupled to a means for rectifying the poly-phase AC output, such as diode bridge rectifier circuits 124, 126. The rectified DC voltage signal outputs from each of the rectifiers 124, 126 are coupled to a DC link 128. This DC link 128 is coupled to a switching means 130 as is known in the art for converting the DC voltage signal to a constant frequency, poly-phase AC voltage. This constant frequency AC output may by coupled through an output filter 132 to the main line feeders 134 which supply electric power to the various aircraft electrical loads (not shown).

The preferred embodiment of the instant invention further comprises logic means 136 which controls the designation of either the first 100 or the second 102 generator as the primary power source, and the other as the standby power source. Means, illustrated as primary voltage regulator 152, are provided to regulate the output voltage of the primary power source by generating a controlled current signal to the exciter field of the generator (100 or 102) which has been designated as the primary source of power. Additionally, means illustrated as pulse exciter 150 are provided to verify the operational readiness of the standby power source by generating a current pulse signal to the exciter field of the generator (100 or 102) which has been designated as the standby source of power. This pulse exciter 150 monitors the output voltage of this standby power source, via lines 154 or 156. The appropriate couplings between the primary voltage regulator 152 and the exciter field power out lines (142 or 144) and the permanent magnet generator power in lines (146 or 148) of the primary source of power, and between the pulse exciter 150 and the exciter field power out lines (144 or 142) and the permanent magnet generator power in lines (148 or 146) of the standby power source are made by the switchable coupling networks 138 and 140 once the control designation is communicated to them from the logic means 136.

Figure 1:
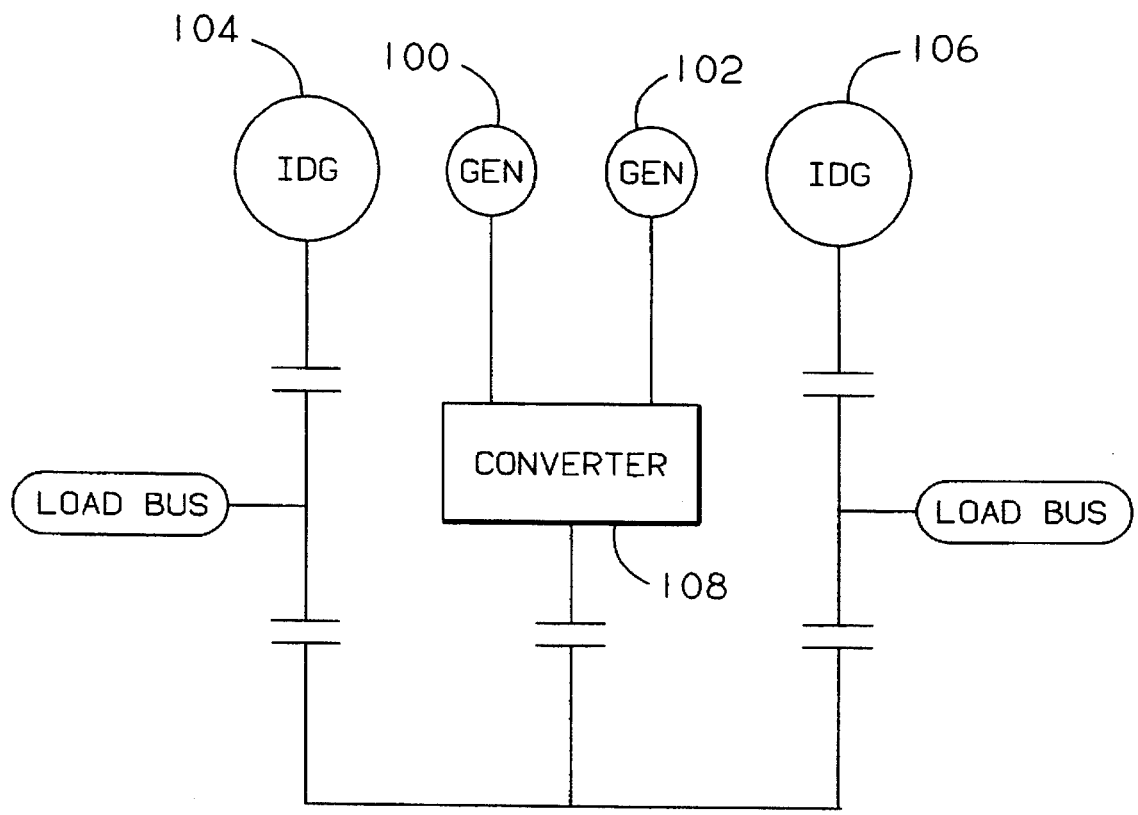
FIG. 1 is a prior art single line diagram of a three channel electric power generating system for use on a two engine aircraft.

In a highly preferred embodiment of the instant invention, the logic means 136, which may be implemented in a microprocessor, programmable logic array, or other appropriate logic circuitry, senses various system parameters to make its determination of the designation of the primary and standby power sources. Parameters such as engine shutdown status, operating status of the main IDGs 104, 105 (see FIG. 1 ), flight crew selections, etc., as well as various control laws which are programmed in the logic means 136 prior to operation are all considered in making the initial determination. This designation, preferably, may be changed after the initial designation based on changing system parameters. Once a designation is changed, the switchable coupling networks 138 and 140 reconfigure to allow the primary voltage regulator 152 to control the output voltage of the newly designated primary power source. The pulse exciter 150 then begins to monitor the operational status of the newly designated standby power source. This reconfiguration also reconfigures the PMG power in so that the primary voltage regulator is using power from the PMG of the primary power source, and the pulse exciter 150 is using power from the PMG of the standby power source.

Figure 3:
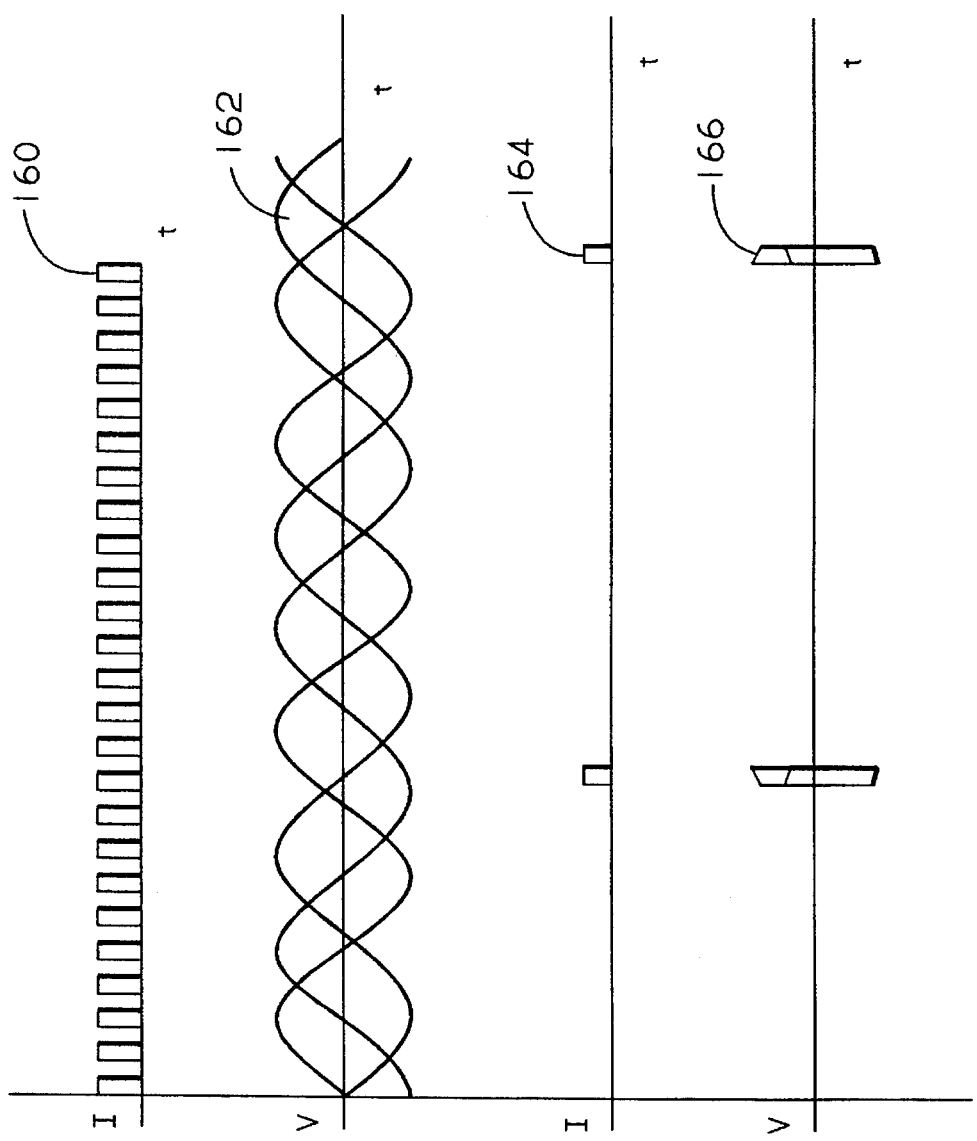
FIG. 3 is a waveform diagram illustrating an aspect of the operation of the instant invention.

The operation of the preferred embodiment of the instant invention is illustrated by the waveform diagram of FIG. 3. Waveform 160 illustrates the controlled current signal produced by the primary voltage regulator 152 and coupled to the exciter field of the primary power source. In response to this controlled current signal, the primary power source generates a three phase AC output represented by waveforms 162. The magnitude of this waveform is controlled by the primary voltage regulator by increasing or decreasing the current pulse width, or changing the duty cycle of the waveform 160. As will be understood by one skilled in the art, other methods of output voltage magnitude control may be appropriate (such as having a constant exciter field drive and using the switching network 130 to control magnitude, etc.), and are within the scope of the instant invention. The pulse exciter output waveform is illustrated by waveform 164. As may be seen, the current pulse signal is controlled to a magnitude such that the output voltage generated by the standby generator, as illustrated by waveform 166, is less than the magnitude of waveform 162. In this way, no power from the standby power source contributes to the power delivered by the DC link 128 to the switching network 130. This current pulse 164 may be preferably a periodic signal to continually verify the operational readiness of the standby power source, or may be generated only upon initiation of a system status check.

A preferred method of verifying the operational readiness of a generator, therefore, comprises the steps of a) providing a current pulse 166 to the exciter field 114, b) monitoring the generator output via lines 154 or 156, and indicating the operational status as "ready" upon detecting a voltage pulse 166 on the generator output, or as "not ready" upon detecting the lack of a voltage pulse on the generator output in response to the current pulse. Preferably, these steps would be repeated at regular intervals to continually verify the operational status of the generator. In a highly preferred method, the additional step of regulating the magnitude of the current pulse to limit the voltage pulse on the generator output to a percentage of the generator's per unit voltage output is included.

Additionally, a preferred method of providing a third source of electric power on a two engine aircraft, wherein the third source comprises a first variable speed generator 100 and a second variable speed generator 102 as described above, comprises the steps of a) designating one of the first or the second generators as a primary power source and one of said first or said second generators as a standby power source, exclusively, b) generating a controlled current signal to the exciter field of the generator designated as the primary power source to maintain its output voltage at a given level, c) generating a current pulse signal to the exciter field of the generator designated as the standby power source, d) monitoring the output of the standby power source, e) indicating the operational status of the standby power source as "ready" upon detecting a voltage pulse on the output of the standby power source generated in response to the current pulse, or as "not ready" upon detecting the lack of a voltage pulse on the output of the standby power source in response to the current pulse, and f) converting the output voltage of the primary power source into a constant frequency voltage for use by the aircraft electrical loads. In a highly preferred method, the step of switching the designation of primary power source and standby power source upon failure or shutdown of the originally designated primary power source if the operational status of the standby power source is "ready" is included.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. A back-up electric power generating system, comprising:

a first variable speed synchronous generator drivably coupled to a first prime mover, said first generator having an exciter field, a rotor, and a poly-phase wound stator forming a first output, said first generator producing a voltage signal on said first output in response to a current signal applied to said exciter field;

a second variable speed synchronous generator drivably coupled to a second prime mover, said second generator having an exciter field, a rotor, and a poly-phase wound stator forming a second output, said second generator producing a voltage signal on said second output in response to a current signal applied to said exciter field;

a converter having a first and a second input coupled to said first and said second generators respectively, and an output;

logic means in controlling communication with said converter for designating one of said first or said second generators as a primary power source and one of said first or said second generators as a standby power source, exclusively;

means selectably coupled to said exciter field of said primary power source and in controlled communication with said logic means for regulating output voltage of said primary power source, said regulating means generating a controlled current signal to maintain said output voltage at a given level thereby;

means selectably coupled to said exciter field of said standby power source and in controlled communication with said logic means for verifying the operational readiness of said standby power source, said verifying means generating a current pulse signal to said exciter field of said standby power source and monitoring said output voltage generated thereby; and wherein said converter produces a constant frequency voltage on said converter output in response to a voltage signal from said primary power source.

2. The system of claim 1, wherein said logic means may change designation of said first generator and said second generator as said primary power source and said standby power source in response to sensed system parameters.

3. The system of claim 1, wherein said verifying means generates said current pulses at regular intervals to continually verify the operational status of said standby power source.

4. The system of claim 1, wherein said current pulses have a controlled magnitude such that said output voltage generated thereby is less than said given level of said output voltage of said primary power source.

5. The system of claim 1, wherein said first generator further comprises a permanent magnet generator drivably coupled to said first prime mover, said permanent magnet generator producing a voltage output, and wherein said second generator further comprises a permanent magnet generator drivably coupled to said second prime mover, said permanent magnet generator producing a voltage output.

6. The system of claim 5, wherein said controlled current signal is generated from said voltage output from said permanent magnet generator of said primary power source.

7. The system of claim 5, wherein said current pulse signal is generated from said voltage output from said permanent magnet generator of said standby power source.

8. The system of claim 7, wherein said verifying means further includes means for compensating the magnitude of said current pulse signal in response to changes in said voltage output from said permanent magnet generator such that said output voltage generated thereby is less than said given level of said output voltage of said primary power source.

9. The system of claim 1, wherein said converter comprises a first means coupled to said first generator for rectifying said voltage signal to a DC voltage signal, said first rectifying means having an output coupled to a DC link, said converter further comprising a second means coupled to said second generator for rectifying said voltage signal to a DC voltage signal, said second rectifying means having an output coupled to said DC link.

10. The system of claim 9, wherein said converter further comprises switching means for converting said DC voltage signal on said DC link to said constant frequency voltage on said converter output.

11. A method of providing a verifiable third source of electric power on a two engine aircraft, the third source having a first variable speed generator drivably coupled to a first prime mover, the first generator having an exciter field, a rotor, and a poly-phase wound stator forming a first output, a second variable speed synchronous generator drivably coupled to a second prime mover, the second generator having an exciter field, a rotor, and a poly-phase wound stator forming a second output, and a converter having a first and a second input coupled to the first and the second generators respectively, and an output, comprising the steps of:

designating one of the first or the second generators as a primary power source and one of said first or said second generators as a standby power source, exclusively;

generating a controlled current signal to the exciter field of the generator designated as the primary power source to maintain its output voltage at a given level;

generating a current pulse signal to the exciter field of the generator designated as the standby power source;

monitoring the output of the standby power source;

indicating the operational status of the standby power source as ready upon detecting a voltage pulse on the output of the standby power source generated in response to the current pulse, or as not ready upon detecting the lack of a voltage pulse on the output of the standby power source in response to the current pulse; and converting the output voltage of the primary power source into a constant frequency voltage.

12. The method of claim 11, further comprising the step of switching the designation of primary power source and standby power source upon failure of the originally designated primary power source if the operational status of the standby power source is ready.

13. The method of claim 11, further comprising the step of switching the designation of primary power source and standby power source upon shutdown of the originally designated primary power source if the operational status of the standby power source is ready.

* * * * *